United States Patent [19]
Kasai et al.

[11] Patent Number: 5,098,275
[45] Date of Patent: Mar. 24, 1992

[54] RAW RESIN MATERIAL FEEDING SYSTEM FOR A MOLDING MACHINE

[75] Inventors: Masayoshi Kasai; Hideo Kuroda; Sensho Saito, all of Nagoya, Japan

[73] Assignee: Mitsubishi Jukogyo Kabushiki Kaisha, Tokyo, Japan

[21] Appl. No.: 580,286

[22] Filed: Sep. 11, 1990

[30] Foreign Application Priority Data

Sep. 29, 1989 [JP] Japan .................................. 1-254865

[51] Int. Cl.$^5$ ............................................ B29C 45/80
[52] U.S. Cl. .................................. 425/145; 264/40.4; 425/146; 425/147; 425/171
[58] Field of Search ............... 264/40.4; 425/140, 145, 425/146, 147, 171

[56] References Cited

U.S. PATENT DOCUMENTS 4,867,665 9/1989 Wada .................................. 425/145

FOREIGN PATENT DOCUMENTS

62-41450 9/1987 Japan .

*Primary Examiner*—Timothy Heitbrink
*Attorney, Agent, or Firm*—Wenderoth, Lind & Ponack

[57] ABSTRACT

The invention is embodied as a raw material resin feeding apparatus for a molding machine, such as an injection molding machine or an extruder. In this system, upon carrying out a variable resin-change operation by making use of material to be changed, raw material resin is intermittently fed to a feed section by intermittently opening and closing a resin passageway. The improvements reside in that the apparatus includes a raw resin material feed selection mechanism provided midway along a resin passageway for selectively either feeding a predetermined amount intermittently or continuously to a feed section. A resin-change resin feed start detector mechanism is provided for detecting completion of discharge of the amount of raw material corresponding to the predetermined amount, and a resin-change completion detector mechanism is provided. With this apparatus, raw material can be selectively fed to effect quick resin-change or for normal operation.

9 Claims, 6 Drawing Sheets

RAW RESIN MATERIAL FEEDING SYSTEM FOR A MOLDING MACHINE

BACKGROUND OF THE INVENTION

1. Field of the Invention

The present invention relates to a raw material feeding apparatus, such as an injection molding machine or an extruding molding machine, and more particularly to such type of raw material feeding apparatus which is excellent for use in a color-change or other resin-change (hereinafter called simply "resin-change") process.

Figure 8:
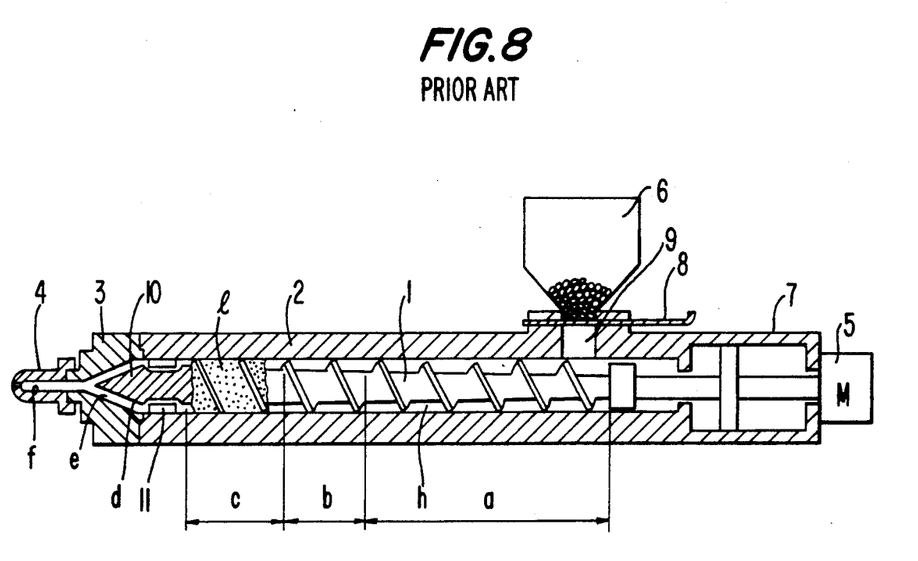
FIG. 8 is a cross-section view of an essential part of an injection molding machine in the prior art.

2. Description of the Prior Art:

One example of an improved prior art raw material feeding apparatus for a resin-change process in an injection molding machine or an extrusion molding machine is disclosed in Japanese Patent Publication No. 62-41450 (1987). In this system, as shown in FIG. 8, a shutter 8 is provided midway along a raw material passageway 9 in the raw material feeding system, and raw material resin is intermittently fed by controllably opening and closing this shutter.

In this figure, reference numeral 1 designates a screw, numeral 2 designates a cylinder, numeral 3 designates an end cap, numeral 4 designates an injection nozzle, numeral 5 designates a hydraulic motor for rotating the screw 1, numeral 6 designates a hopper for feeding raw material resin, and numeral 7 designates an injection cylinder. The shutter 8 is provided for opening and closing the raw material passageway 9 at predetermined times, and is controlled by a controller (not shown). It is to be noted that in this figure, reference numeral 10 designates a torpedo-shaped tip member.

A feed section a, a compression section b, and a metering section c are sequentially formed along the screw 1 from its base end portion. The locations where old resin is most liable to collect are an outer circumferential surface d of the tip member 10, an inner wall surface e of the end cap 3, and an inner wall surface f of the nozzle 4. Here, the raw material feeding system includes the hopper 6, the shutter 8, the raw material passageway 9 and a shutter opening/closing mechanism (not shown). It is to be noted that the raw material passageway 9 includes not only a portion of the cylinder 2, but also a cylindrical outlet portion of the hopper 6.

The method of resin-change for the raw material being fed in the above-described raw material feeding system as disclosed in the above-noted Japanese patent publication consists of the following steps:

(1) At first, the raw material passageway 9 in the raw material feeding apparatus is blocked by the shutter 8 to interrupt feeding of old raw material. Under this condition, rotation of the screw 1 and injection are repeated to bring at least the feed section a and the compression section b of the screw 1 into a hollow or emptied condition (this is also called "hunger condition"), and also the raw material within the hopper 6 is replaced by new material.

(2) Next, the shutter 8 is opened and the screw 1 is rotated. At this time, the above-mentioned hollow section is filled with new non-molten resin.

(3) Under this condition, if rotation of the screw 1 is continued, molten resin having a higher viscosity than at the time of steady operation is fed to the resin collecting sections d, e and f in the tip end portion of the screw 1. Therefore, the resin pressure increases and the screw 1 is caused to retreat.

(4) When the screw 1 has retreated to the extreme rearward end of a metering stroke, rotation of the screw 1 is stopped, a hydraulic pressure is applied to the back pressure side of the cylinder 7, and the screw 1 advances to cause injection. At this time, molten resin having a high viscosity flows through the residual resin collecting sections d, e and f, such that a large shearing force acts upon the wall surface of the resin passageway and scrapes the old residual resin adhered to the wall surface. By repeating these screw rotation and injection steps, removal of old residual resin adhered to various surfaces proceeds to thereby result in change of the resin such that the removal soon reaches a steady state. This is caused, in the upstream portion of the resin flow, mainly by a scraping action caused by shearing forces exerted by a solid bed of non-molten resin, and in the downstream portion of the same, by a scraping action caused by large shearing forces due to flow of high viscosity molten resin.

(5) However, with this newly established steady state, temperatures at the respective portions will increase and viscosity of the resin will decrease, such that the shearing forces acting upon the wall surfaces are reduced and the above-described effect decreases. Therefore, the shutter 8 is closed, and the above-described respective operations (1), (2) and (3) can again be carried out. These operations can be carried out repeatedly.

In the above-described prior art method of resin-change, feeding of raw material resin within a hopper is stopped and new non-molten resin is fed to a hollow (or empty) space within a cylinder where old molten resin has been extracted. This provides special advantages in terms of reduction of the amount of consumed resin by 60% as compared to the conventional method of the prior art, in which resin change is effected simply by repeating rotation of a screw and injection after replacement of resin.

However, a shortcoming remains in the above-described method of resin-change, in that the time required for resin-change is not improved significantly relative to the conventional method in the prior art. The principal cause of this resides in the fact that the amount of resin filled per cycle in the above-described resin-change operation steps (1)–(5) is too large, such that after it has reached the steady state, the time necessary for producing a hollow or empty space to fill with non-molten resin, that is, the time for discharging the resin, cannot be shortened.

SUMMARY OF THE INVENTION

An object of the present invention is to resolve the above-mentioned problems in the prior art, and more particularly to provide a novel raw material feeding apparatus for a molding machine, in which the time required for the resin-change process can be shortened, the above-described resin filling amount reduced to a minimum, and the scraping effect maximized.

According to one feature of the present invention, there is provided a raw resin material feeding apparatus for a molding machine, for example, an injection molding machine or an extruder, in which upon carrying out a variable-color operation by making use of materials to be changed in color, raw material resin is intermittently fed to a feed section by intermittently opening and closing a resin passageway. The apparatus comprises raw resin material feed selection means provided midway along a resin passageway for selecting either one of "intermittent feed of a predetermined amount" and "continuous feed" with respect to feeding of raw resin material to a feed section, a resin-change resin feed start detector means for detecting a timing for starting feed of the predetermined amount, discharge completion detector means for detecting completion of discharge of the amount of raw resin material corresponding to the predetermined amount, and resin-change completion detector means, whereby raw material feed can be selectively carried out for quick resin-change or for normal operation.

According to another feature of the present invention, control for a predetermined resin filling amount can be effected by metering a predetermined volume of raw material corresponding to one injection amount or a plurality of injection amounts, either by opening time control for a single opening/closing means for opening and closing a raw material passageway or by providing two spaced apart opening/closing means and alternatingly opening and closing these means. In this manner, the minimum amount of resin material which provides a maximum scraping effect can be filled.

According to still another feature of the present invention, the discharge completion detector means consists of either injection start position detector means or a combination of the same injection start position detector means and time limit setting means using the screw position after completion of injection as the starting point.

In essence, the characteristic feature of the present invention exists in that a small amount of non-molten resin is filled in a hollow or empty portion about a screw a plurality of times, such that a resin-change process is carried out and, at the same time, a large scraping effect is produced. In this manner, resin loss is reduced and the process time is shortened.

In operation of the raw material feeding apparatus according to the present invention, if a resin-change command is issued during a main cycle of a controller, comparison is carried out in a judgement section of the resin-change completion detector means, and when resin-change has not been completed, the initial value of the signal issued from the resin-change completion detector means is 0, hence a signal representing NO is output, and the raw resin material feed selection means stops feeding the raw material. However, even after the feeding of raw material has been stopped, the injection cycle continues until the hollow space or empty portion within the cylinder extends along a predetermined length thereof. The fact that the length of the hollow space portion has reached the predetermined length is determined by the resin-change resin feed start detector means, and at this time, a predetermined amount of the first variable-type raw resin material is fed and injection is effected once or a plurality of times to discharge the resin within the cylinder. Whether this discharged amount has reached the particular feed amount or not is determined by a predetermined fill amount discharge detector means, and these discharge cycles continue until the condition is fulfilled.

Completion of the above-described discharge is determined, for instance, depending upon whether or not the number of times of injection has reached a preset value. An input value for the condition of resin-change completion is increased by one each time the discharge cycle is completed, and these cycles continue until the value reaches the preset value, that is, until the predetermined amount of raw resin material is filled and discharged a predetermined number of times. If the above-mentioned input value reaches the preset value, the resin-change is completed, and thereafter, the apparatus is reset into a normal operation state and wherein the operation returns to a normal molding cycle.

According to the present invention, since resin to be changed is incrementally fed to a screw, and resin-change is thereby always effected under the condition that a scraping effect by high viscosity resin is large, the following advantages are obtained:

(1) The time required for resin-change is greatly shortened.

(2) The amount of resin consumed for resin-change is reduced, and so, material waste is reduced.

(3) The resin-change process and molding operations after the resin-change process can be automated, thereby resulting in improved productivity.

The above-mentioned and other objects, features and advantages of the present invention will become more apparent by reference to the following description of preferred embodiments of the invention taken in conjunction with the accompanying drawings.

DESCRIPTION OF THE PREFERRED EMBODIMENTS

In the following, the present invention will be described in greater detail in connection with the preferred embodiments illustrated in the accompanying drawings.

Figure 1:
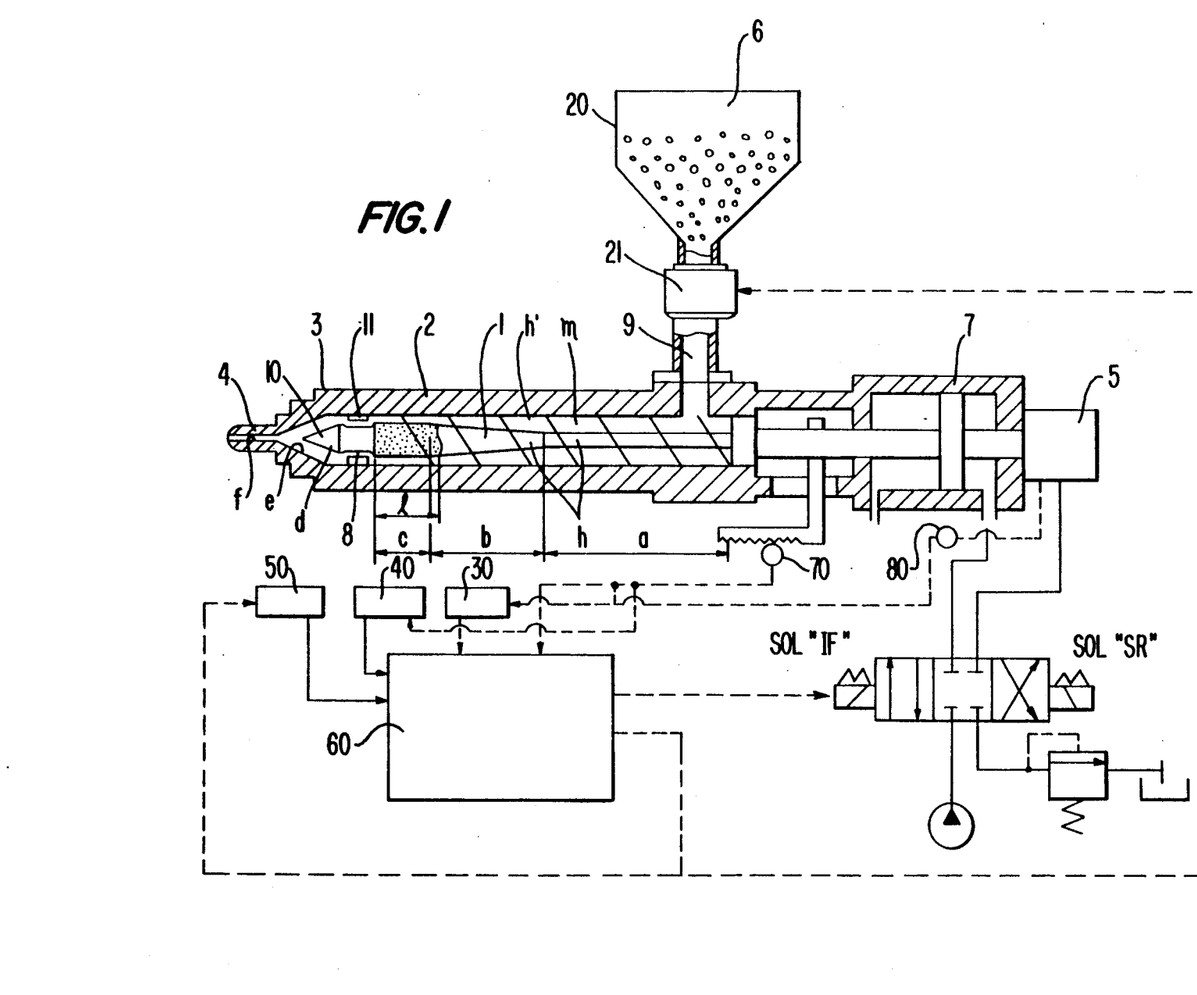
FIG. 1 is a cross-section view of an essential part of an injection molding machine according to a first preferred embodiment of the present invention.

In one representative embodiment of the present invention as applied to an injection molding machine in FIG. 1, reference numeral 1 designates a screw, numeral 2 designates a cylinder, numeral 3 designates an end cap, numeral 4 designates an injection nozzle, numeral 5 designates a motor for rotating the screw 5, numeral 6 designates a hopper for feeding raw resin material, numeral 7 designates a hydraulic cylinder for injection, numeral 9 designates a raw material passageway, numeral 10 designates a torpedo-shaped tip member, numeral 11 designates a check ring. These component parts are equivalent to corresponding component parts denoted by like reference numerals in the raw material feeding apparatus in the prior art shown in FIG. 8.

Reference numeral 20 designates generally a raw material feeding apparatus according to this preferred embodiment, which is composed of the following component parts including the above-mentioned hopper 6 for feeding raw resin material and the raw material passageway 9.

Reference numeral 21 designates raw resin material selection means in the feeding system according to the present invention. In this preferred embodiment, the selection means 21 is provided midway along the raw material passageway 9 communicating the hopper 6 for feeding raw resin material with the inside of the cylinder 2. It comprises, for example, a shutter adapted to open and close the raw material passageway 9 in response to a command issued from a controller 60.

Reference numeral 30 designates resin-change resin feed start detector means for determining whether or not a hollow space has reached a predetermined length. For example, the feed start detection means 30 may detect the fact that a number of revolutions of the screw 1 counted by a well-known screw revolution number counter 80 has reached a preset screw revolution number and outputs a signal to the controller 60.

Reference numeral 40 designates discharge completion detector means for detecting whether or not a particular amount of filled resin has been discharged by repetition of injection. This detector means measures, for instance, a number of strokes of the screw 1 by means of a measuring instrument, and outputs a signal to the controller 60 to switch to a normal operation when the measured number of strokes has reached a preset number of strokes.

Reference numeral 50 designates resin-change completion detector means, and comprises, for example, a detector means which outputs a signal to the controller 60 to switch to a normal operation when a number of times of filling of a particular amount of raw resin material has reached a preset number of times.

Figure 2:
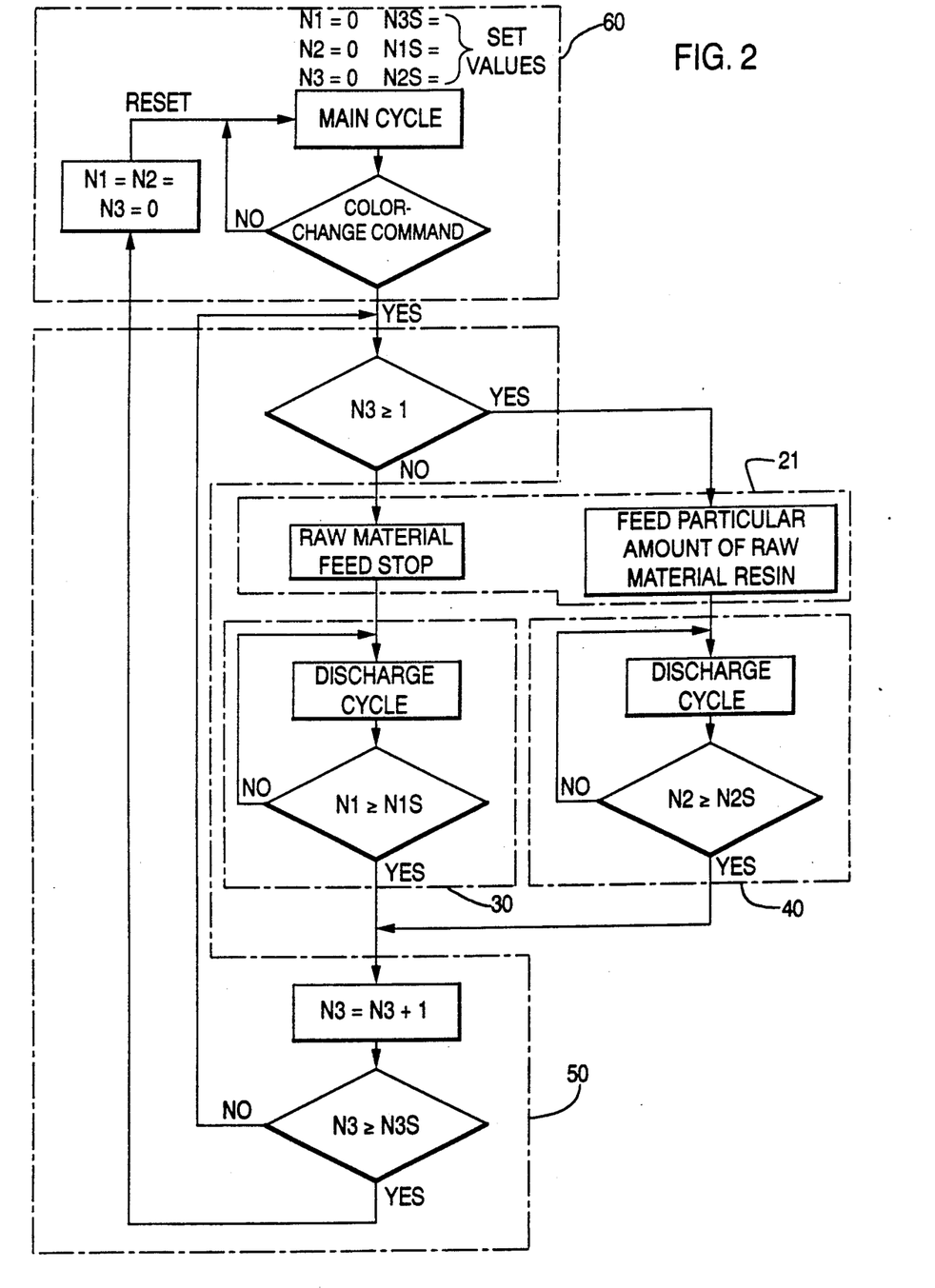
FIG. 2 is a flow chart of the present invention.

FIG. 2 shows a flow chart of operations in an injection molding machine having the raw resin material feeding apparatus according to the above-described embodiment.

In this figure, symbol $N_1$ represents a number of revolution of the screw, symbol $N_2$ represents a number of times of injection, symbol $N_3$ represents a number of occurrences of feeding of a particular amount of raw resin material, and symbols $N_{1S}$, $N_{2S}$ and $N_{3S}$ represent preset reference values for $N_1$, $N_2$ and $N_3$, respectively, and have the following meanings:

$N_{1S}$ ... judgement standard for determining a feed start timing of resin to be changed, and it is either a set reference time or set reference value of a total number of screw rotations.

$N_{2S}$ ... determination standard for determining completion of discharge of a particular filling amount of raw resin material, and it is a set reference value for the number of occurrences of injection.

$N_{3S}$ ... a value serving as a standard value for detecting and judging completion of resin change, and it is a set reference value for the number of times a particular amount of raw resin material is to be fed.

Now description will be made of the operation of the above-described apparatus with reference to FIGS. 1 and 2.

(1) If a resin-change operation signal is output during a main cycle of the controller 60, raw material resin feed selection means 21 of the raw material resin feeding apparatus 20 stops feeding of old raw material.

(2) Generally if an injection operation is continued while no raw material is being fed, then resin within a raw resin material conveying channel space h' formed by a screw channel m of the screw 1 and an inner wall surface of the cylinder 2 is reduced from the base portion of the screw 1 towards its tip end portion. In this manner, the supply of resin material in the channel m is formed with a hollow space portion h (or a hunger portion) which gradually increases in diameter toward the tip end portion.

The flow of molten resin is checked by the check ring 11 provided at the tip end (about the torpedo-shaped tip member 10) of the screw 1. The above-described hollow space increases in diameter up to a position at which a balancing takes place between an effective pushing force caused by the threads of the screw 1 acting upon the checked molten resin and a flow resistance of molten resin flowing through a gap g formed between an inner wall surface of the check ring 11 and an outer wall surface of the screw 1. From this equilibrium position forwardly, the hollow space h no longer increases in diameter, and the so-called "residual resin" is formed at l. The distance from the resin feed port (i.e. from passageway 9) to the equilibrium position is called the "hunger length".

Molten resin remains on the contact surfaces on the downstream side of the resin flow towards the nozzle 4 behind the residual resin l, for instance, on the outer circumferential surface d of the torpedo-shaped tip member 10, the inner wall surface e of the head cover 3, the inner wall surface of the nozzle 4 and the surface of the check ring gap clearance g.

In addition, due to the fact that in the compression section b of the screw 1, the bottom surface of the screw channel is inclined at an angle such that it is flared toward the tip end, a substantial amount of resin also adheres to the channel wall portion of this section.

The largest diameter state or a state close thereto of the hollow space portion in the thread channel of the screw 1 after stoppage of raw material feed, can be determined by preliminarily investigating time or a total number of revolutions of the screw by experiments or simulations. This is preset in time limit setting means or screw revolution number counting means, and is detected by the resin-change resin feed start detector means 30.

(3) In response to an output from resin-change resin feed start detector means 30, the controller 60 sends a raw material feed command to raw material feed selection means 21, such that the raw material is fed until a particular amount of new raw resin material has been fed.

Figure 5:
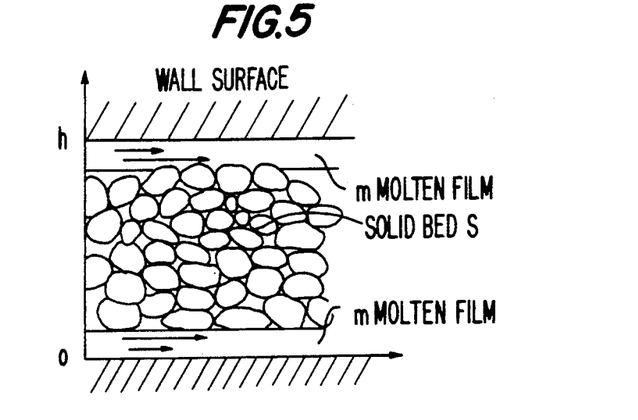
FIG. 5 is a schematic view showing a flow model of a solid bed.

(4) With the channel portion h in a hollow condition (i.e. substantially empty), non-molten resin is fed in an amount insufficient to fill the length of the hollow space from the raw material passageway 9 towards the above-mentioned residual resin portion. This non-molten resin moves within the screw channel in the state of a solid bed S (see FIG. 5), such that an extremely large shearing force acts upon the surface of the screw channel (see FIG. 6) and performs scraping of a resin film in the compression section b of the screw to which a lot of old molten resin has adhered.

If revolution of the screw is continued, the residual resin l at the tip end portion of the screw 1 is pushed out to the side of the nozzle 4 through the check ring 11. Also, the raw resin material fed in a solid bed state also melts and is pushed out through the gap clearance g of the check ring 11, and at the same time the screw 1 is caused to retreat due to a back pressure of the molten resin.

(5) When the screw 1 has retreated up to an injection position, the controller 60 stops rotation of the screw 1 and commands injection, and so, injection is carried out by making the screw 1 advance.

(6) Thereafter, this operation is repeated while no raw material is being fed. After the previously filled old resin has been injected (i.e. discharged) and a particular amount of new molten resin has been filled and injected, for the resin conveyed through the hunger portion, shearing heat generation and heat input are less than they would be in a continuous injection operation. Therefore, resin having a high viscosity is injected, large shearing forces produced by highly viscous molten resin act upon the surfaces of the above-described resin staying portions d, e, f and g (see FIG. 7), and removal of a film of used resin proceeds due to the scraping effect.

(7) In correspondence to the step where hollow space growth about the screw 1 caused by discharge of a particular amount of filled resin has reached an equilibrium point (i.e. no longer grows), a number of times of injection corresponding to the predetermined filled amount is preset, and by detecting the fact that the number of times of injection has reached this set value with the discharge detector means 40, such as a counter, it can be determined that the particular amount of filled resin has been discharged.

Figure 6:
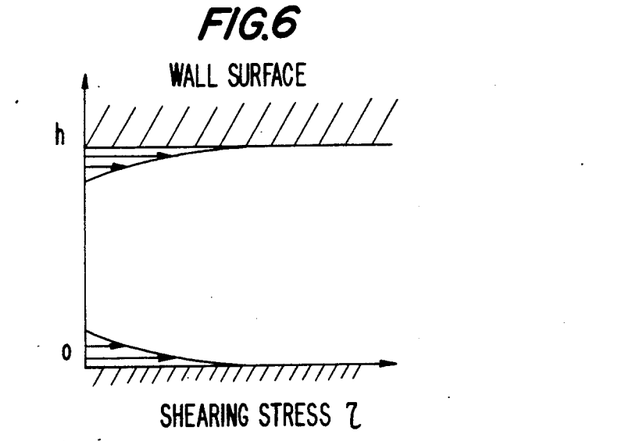
FIG. 6 is a diagram showing a shearing stress distribution model in a solid bed.
Figure 7:
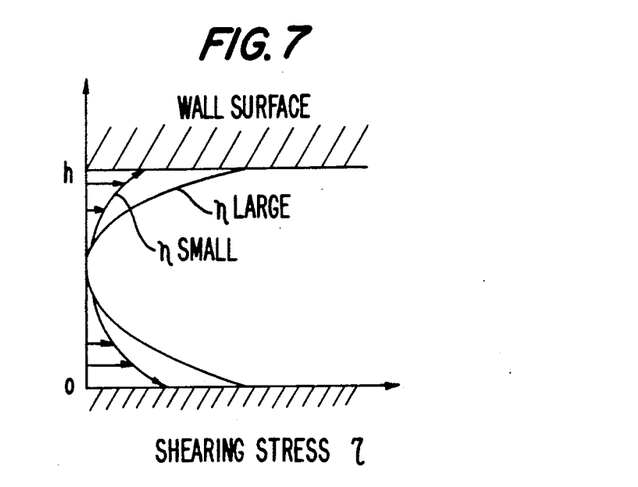
FIG. 7 is a diagram showing a shearing stress distribution model in molten resin.

(8) Thereafter, the steps (3) to (6) above are repeated, and the fact that the number of repetitions has reached a set value, is detected by resin-change completion detector means 50 such as a counter. Then a resin-change completion signal is sent to the controller 60, and thereafter, a normal molding cycle, which defines the main cycle of the operation, is carried out. Hence, reference symbol n in FIGS. 6 and 7 represents a viscosity and symbol t represents a shearing stress.

It is to be noted that in the case where the present invention is applied to an extruder, in view of the fact that in an extruder the amount called "residual resin l" is not present because the check ring is not provided, if a number of revolutions of a screw or time until a hollow space length reaches a predetermined length after stoppage of raw material feed is preliminarily determined, and if feed and discharge of the corresponding particular amount are carried out the preset number of times, an effect similar to that described above can be achieved.

Now, with respect to a method for measuring a predetermined amount of fed resin upon resin-change, explanation will be made in greater detail, by way of example, with reference to a second preferred embodiment shown in FIG. 3.

In this example, the measurement is carried out by raw resin material feed selection means consisting of two shutters 21-1 and 21-2 provided at an interval midway along the raw material passageway 9 under the hopper 6 of the raw material feed means 20. At first the lower side shutter 21-2 is closed, and subsequently the upper side shutter 21-1 is opened. Then, the amount of raw resin material in the hopper 6 dropping through the raw material passageway 9 is always maintained at a constant height, and if the upper side shutter 21-1 is closed at this time, the amount j of raw material resin confined between the shutters 21-1 and 21-2 defines a predetermined amount.

Under this condition, if a raw resin material feed command is received, the lower side shutter 21-2 is opened, and the predetermined amount of raw resin material is fed to the feed section a of the screw 1.

If feed of raw material is completed (detection of this can be carried out by means of a photo-electric switch or the like), the lower side shutter 21-2 is closed, thereafter the upper side shutter 21-1 is opened, and if the number of times of feed at this time is equal to or less than a predetermined number of times of feed, the apparatus can be held in a standby state while maintaining this measuring condition. After a feed command has been issued from the controller 60, the upper side shutter 21-1 is closed and the above-described feeding operation of the predetermined amount is carried out.

On the other hand, in response to a continuous feed command, both shutters 21-1 and 21-2 are held in an open state.

In an injection molding machine, if a particular feed amount is determined to be equivalent to a delivery amount during one injection, and an injection cycle is carried out each time the particular amount is fed, then the resin-change process is proceeding under optimum conditions, and the amount of resin loss as well as the operational time loss caused by resin-change are minimized. Of course, this particular amount could be determined to be equivalent to an amount of a plurality of injections.

Injection by the screw can be initiated in response to either an output from a potentiometer, serving as a retreated position detector means, or an output from a timer means which starts time count when the screw has reached the end of advance after injection and outputs an ON signal after a predetermined period of time. And, in the case where the predetermined amount is set at about the amount to be delivered by one injection, although there is a distribution of injection amounts over the respective injections, if the predetermined amount and the period of time are selected so that the viscosity upon injection falls within a proper range, then the resin-change operation can proceed without mechanical damage due to the resin-change operation. Completion of resin-change can be detected by counting the number of injections or the number of occurrences of feeding of the predetermined amount, and comparing this with a preset value.

Figure 3:
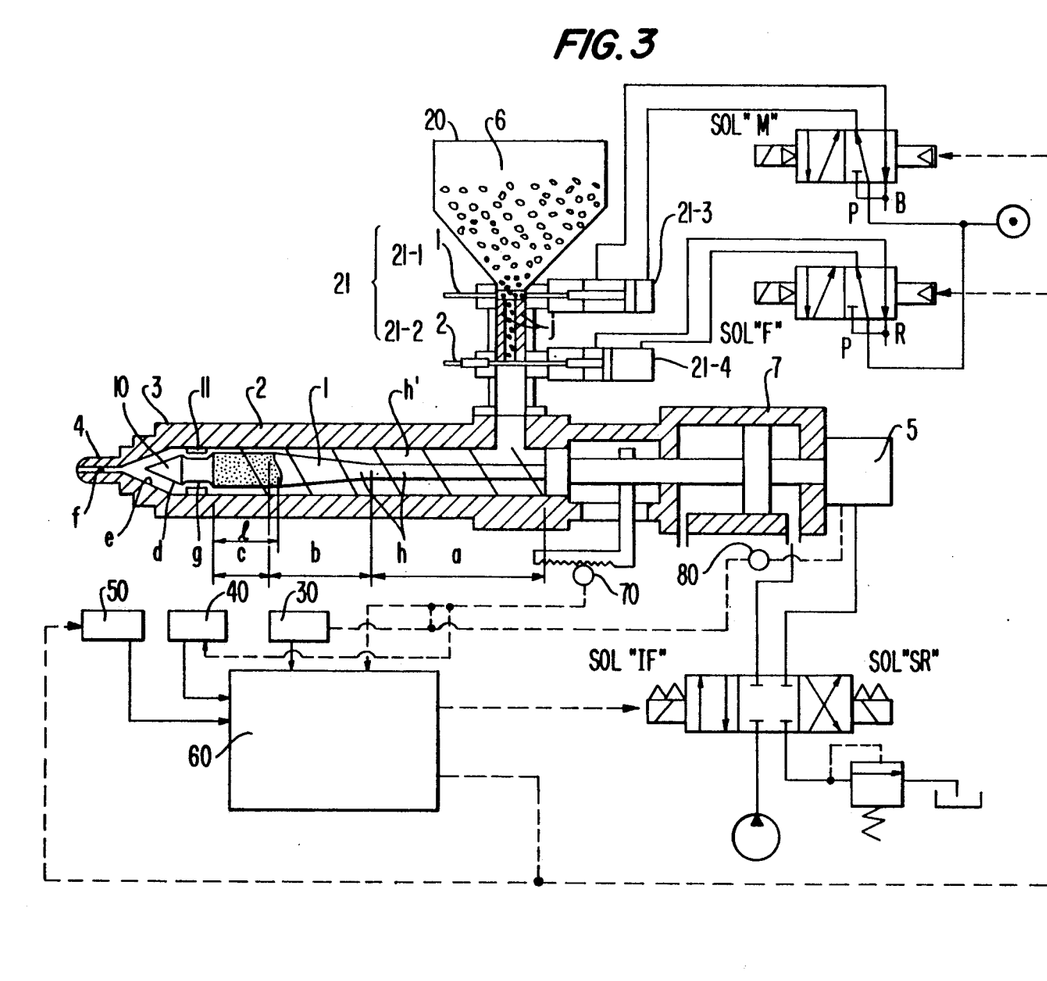
FIG. 3 is a cross-section view of an essential part of an injection molding machine according to a second preferred embodiment of the present invention.

FIG. 3 shows the second preferred embodiment of the present invention. In this figure, reference numeral 21-1 designates the upper side shutter, while numeral 21-2 designates the lower side shutter, and these shutters are provided midway along the raw material passageway 9 and are spaced from each other. The respective shutters 21-1 and 21-2 are fixedly connected to piston rod ends of pneumatic cylinders 21-3 and 21-4 for respectively actuating the shutters.

A metering operation for a predetermined amount of resin material is the same as described above in connection with the first preferred embodiment. That is, as a result of the fact that the respective shutters 21-1 and 21-2 perform 2-position operations as actuated by the pneumatic cylinders 21-3 and 21-4, control can be effected for either metering and intermittently feeding or for continuously feed. The control sequence is essentially the same as illustrated in the flow chart of FIG. 2. Alternatively, the above-described 2-position operation can be carried out by making use of a rotary disc and rotary drive means for the disc.

Figure 4:
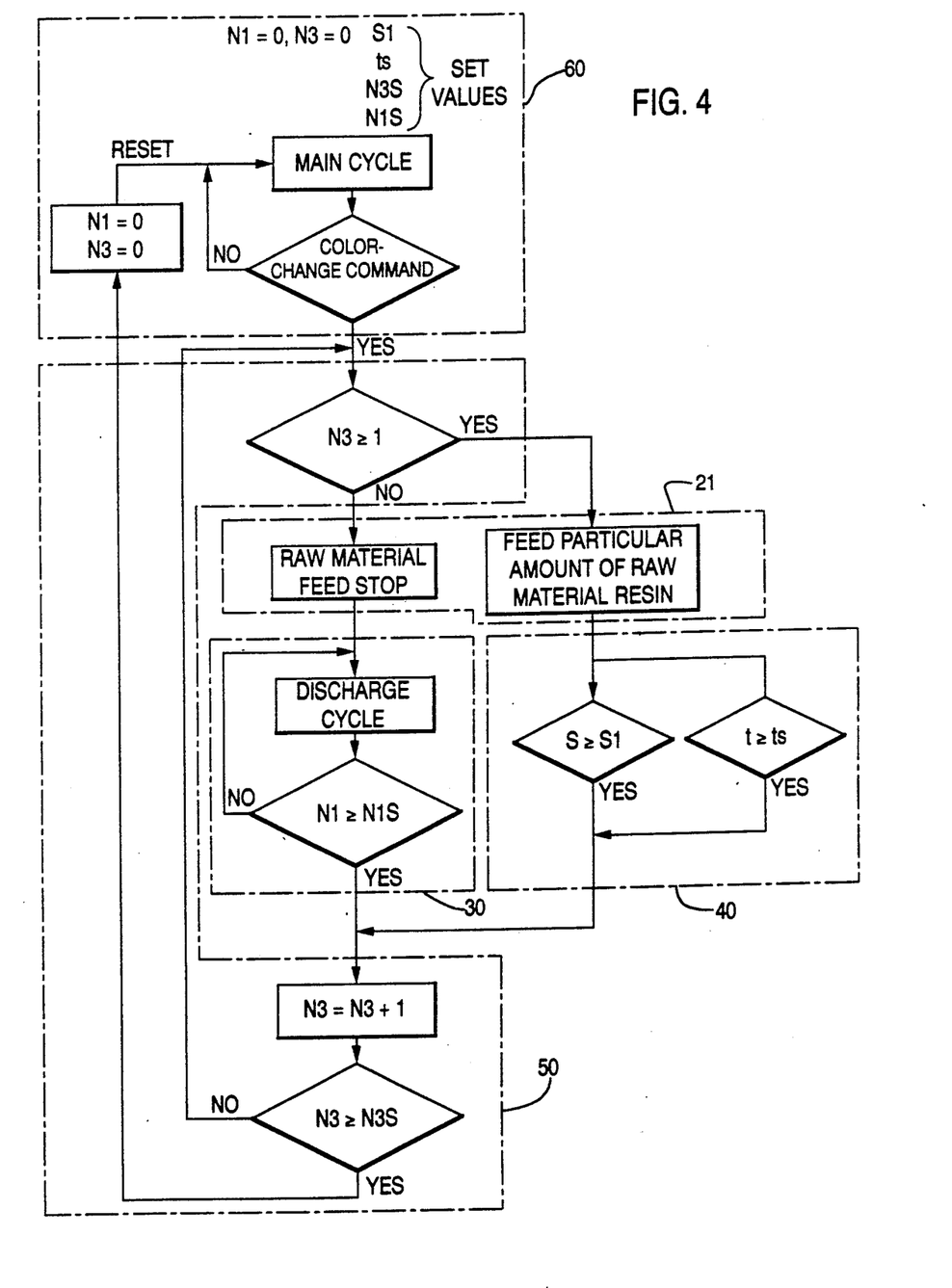
FIG. 4 is a flow chart for a third preferred embodiment of the present invention.

FIG. 4 is a flow chart representing an operation according to a third preferred embodiment of the present invention. In this case, a predetermined amount of resin material is equal to the amount delivered with one injection. This is basically the same as the operation shown by the flow chart in FIG. 2 except that detection of the completion of discharge of the predetermined amount is effected by an output S of a screw stroke detector means 70 (for instance, a potentiometer) or timer means which uses the time of the last completion of discharge of the predetermined amount as a starting point. In FIG. 4, reference symbol $S_1$ designates a predetermined output value which serves as a reference value for a screw stroke, and symbol $t_s$ designates a predetermined reference time.

As will be apparent from the detailed description of preferred embodiments of the present invention, according to the present invention, since resin to be changed is incrementally fed to a screw, and resin-change is thereby always effected by a large scraping effect caused by high viscosity resin, the following advantages are obtained:

(1) The time required to effect resin-change is greatly shortened.

(2) The amount of resin consumed to effect resin-change is reduced, and so, material waste is reduced.

(3) The resin-change process and molding operations after such resin-change process can be automated, thereby resulting in improved productivity.

While the principles of the present invention have been described above in connection with preferred embodiments of the invention, it is intended that all matter contained in the above description and illustrated in the accompanying drawings shall be interpreted to be illustrative and not limiting.

What is claimed is:

1. A raw resin material feeding apparatus for use in effecting a change of resin used in a molding machine, comprising:

a feed section adapted to receive raw non-molten resin material;

a supply means for supplying raw non-molten resin material to said feed section;

a resin passageway communicating said feed section with said supply means;

raw resin material feed selection means, mounted in said resin passageway, for selectively feeding a predetermined amount of the raw non-molten resin material either intermittently or continuously from said supply means to said feed section;

resin material feed start detection means for determining when to start feeding of the predetermined amount of the raw non-molten resin material from said supply means to said feed section;

a nozzle in communication with said feed section and adapted to have molten resin discharged therethrough;

discharge completion detection means for determining when the predetermined amount of the resin material has been discharged through said nozzle; and resin-change completion detection means for determining completion of the change of the resin.

2. An apparatus as recited in claim 1, further comprising an injection means, in communication with said nozzle and said feed section, for intermittently discharging molten resin through said injection nozzle; and wherein said raw resin material feed selection means is operable, when intermittent feeding has been selected, to feed an amount of raw non-molten resin material during a discrete feeding occurrence which corresponds to an amount of molten resin discharged during a discrete injection occurrence.

3. An apparatus as recited in claim 1, further comprising an injection means, in communication with said nozzle and said feed section, for intermittently discharging molten resin through said injection nozzle; and wherein said raw resin material feed selection means is operable, when intermittent feeding has been selected, to feed an amount of raw non-molten resin material during a discrete feeding occurrence which corresponds to an amount of molten resin discharged during a plurality of discrete injection occurrences.

4. An apparatus as recited in claim 1, wherein said raw resin material feed selection means comprises two valve means for selectively opening and closing said resin passageway, respectively, said two valve means being mounted in said resin passageway with a predetermined spacing between said two valve means; and the predetermined amount of the raw non-molten resin material is determined by said predetermined spacing between said two valve means.

5. An apparatus as recited in claim 1, further comprising an injection means, in communication with said nozzle and said feed section, for intermittently discharging molten resin through said injection nozzle, said injection means comprising a rotatable and reciprocable screw, having a predetermined reciprocation stroke; and wherein said discharge completion detection means comprises a screw stroke detection means detecting when said screw is at a beginning of its stroke.

6. An apparatus as recited in claim 5, wherein said discharge completion detection means further comprises a timer means for timing completion of discrete occurrences of injection.

7. An apparatus as recited in claim 1, wherein said resin-change completion detection means comprises means for determining when the number of discrete occurrences of injection of molten resin material through said nozzle has reached a predetermined reference value.

8. An apparatus as recited in claim 1, wherein said resin-change completion detection means comprises means for determining when the number of discrete occurrences of feeding of the raw non-molten resin material from said supply means to said feed section has reached a predetermined reference value.

9. An apparatus as recited in claim 1, wherein an injection means, in communication with said nozzle and said feed section, for intermittently discharging molten resin through said injection nozzle, said injection means comprising a rotatable and reciprocable screw, having a predetermined reciprocation stroke; and said resin material feed start detection means comprises means for determining when a number of rotations of said screw reaches a predetermined reference value.

* * * * *